United States Patent
Stanley et al.

(10) Patent No.: US 9,939,311 B2
(45) Date of Patent: Apr. 10, 2018

(54) SYSTEM AND METHOD TO DISPLAY AND TRACK MACHINE INTERRUPTED LOADING CYCLES

(71) Applicant: Caterpillar Inc., Peoria, IL (US)

(72) Inventors: Robert Walter Stanley, Chillicothe, IL (US); Jeffery Edwin Buettner, East Peoria, IL (US); Aaron Mitchel Elwell, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 868 days.

(21) Appl. No.: 14/460,987

(22) Filed: Aug. 15, 2014

(65) Prior Publication Data

US 2016/0047689 A1    Feb. 18, 2016

(51) Int. Cl.
G01G 19/12    (2006.01)
E02F 9/26    (2006.01)
G06Q 50/08    (2012.01)

(52) U.S. Cl.
CPC ............... *G01G 19/12* (2013.01); *E02F 9/26* (2013.01); *G06Q 50/08* (2013.01)

(58) Field of Classification Search
CPC ............................. G06Q 10/087; G01G 19/12
See application file for complete search history.

(56) References Cited

U.S. PATENT DOCUMENTS

| 4,230,196 A * | 10/1980 | Snead .................... E02F 3/3411 177/141 |
| 4,390,075 A * | 6/1983 | Snead .................... E02F 3/3411 177/1 |
| 4,921,578 A | 5/1990 | Shiraishi et al. |
| 5,801,964 A * | 9/1998 | McCarthy ................ G07C 3/10 702/182 |
| 5,822,224 A | 10/1998 | Nakanishi et al. |
| 5,848,368 A * | 12/1998 | Allen ..................... G08G 1/202 172/4.5 |
| 8,112,202 B2 | 2/2012 | Fackler et al. |
| 8,626,541 B2 | 1/2014 | Doan et al. |
| 2007/0135985 A1 | 6/2007 | Berry et al. |
| 2009/0063222 A1 * | 3/2009 | Doan ..................... G06Q 10/00 705/7.13 |
| 2009/0095539 A1 | 4/2009 | Pfohl et al. |
| 2010/0006377 A1 * | 1/2010 | McCabe ............ B66F 9/07545 187/224 |

(Continued)

FOREIGN PATENT DOCUMENTS

GB        2461273 A * 12/2009 ............ B60P 1/6463

*Primary Examiner* — Scott A Zare
(74) *Attorney, Agent, or Firm* — James S. Bennin; Miller, Matthias & Hull (57) ABSTRACT

A payload monitoring system is disclosed. The payload monitoring system may include a machine, an operator interface configured to receive input from and output data to an operator of the machine, and a controller in communication with the machine and the operator interface. The machine may include an implement assembly for loading payload material onto at least one receptacle. The controller may be configured to start a first load cycle to monitor loading of payload material by the implement assembly onto a first receptacle, receive a signal from the operator interface to pause the first load cycle, stop monitoring of the first load cycle, and save data associated with the first load cycle into a memory associated with the controller.

19 Claims, 6 Drawing Sheets

(56) References Cited

U.S. PATENT DOCUMENTS

| | | |
|---|---|---|
| 2010/0312599 A1 | 12/2010 | Durst |
| 2011/0301817 A1* | 12/2011 | Hobenshield ............. E02F 9/26 |
| | | 701/50 |
| 2011/0309935 A1 | 12/2011 | Emmett et al. |
| 2012/0158279 A1 | 6/2012 | Faivre et al. |
| 2014/0095032 A1* | 4/2014 | Mulder .................. G01G 19/08 |
| | | 701/50 |
| 2015/0240458 A1* | 8/2015 | Nagato .................. E02F 3/435 |
| | | 701/32.7 |

\* cited by examiner

SYSTEM AND METHOD TO DISPLAY AND TRACK MACHINE INTERRUPTED LOADING CYCLES

FIELD OF THE DISCLOSURE

The present disclosure relates generally to machines and, more particularly, to payload monitoring systems and methods in a machine.

BACKGROUND OF THE DISCLOSURE

In worksites, such as, quarries or other material collection sites, loading machines may be used to load material onto haul vehicles. Examples of loading machines may include but not be limited to wheel loaders, backhoe loaders, track-type loaders, and the like. Examples of haul vehicles may include dump-trucks, freight trains, and the like.

Typically, the loading machines are under control of the quarry since they are an integral part of the quarry operation. Haul vehicles typically are not owned by the quarries, but by individual customers. As such, quarry personnel need to interact with each haul vehicle operator to identify who the customer is and the type and amount of payload material desired by the customer. However, verbal interaction between quarry personnel and haul vehicle operators may be time consuming and inefficient.

Moreover, to determine if a haul vehicle has been loaded with the desired amount of payload material, the haul vehicle may be driven onto scales and weighed. Further loading or removal of the payload material and further weight assessment of the haul vehicle may be required to attain the correct amount of the desired payload material, thereby costing additional time and money. For billing purposes, it is also important to determine the actual amount and type of material loaded on each haul vehicle with the correct customer identification.

A workplace management system is disclosed in U.S. Pat. Pub. No. 2011/0309935 A1, entitled, "Workplace Management System." The 2011/0309935 publication describes a system for tracking objects on a construction site, wherein a truck is provided with a radio frequency identification (RFID) tag and a loader is provided with a RFID reader. When the truck moves proximate the loader, the tag and reader communicate with each other and record whatever information is within the system.

While effective, improvements in monitoring of loading operations to improve the efficiencies and accuracy of same are desired.

SUMMARY OF THE DISCLOSURE

In accordance with one embodiment, a payload monitoring system is disclosed. The payload monitoring system may include a machine, an operator interface configured to receive input from and output data to an operator of the machine, and a controller in communication with the machine and the operator interface. The machine may include an implement assembly for loading payload material onto at least one receptacle. The controller may be configured to start a first load cycle to monitor loading of payload material by the implement assembly onto a first receptacle, receive a signal from the operator interface to pause the first load cycle, stop monitoring of the first load cycle, and save data associated with the first load cycle into a memory associated with the controller.

In accordance with yet another embodiment, a method for managing loading operations of a machine is disclosed. The machine may have a controller and an implement assembly for loading payload material onto at least one receptacle. The method may include the controller starting a first load cycle to monitor loading of payload material by the implement assembly onto a first receptacle, the controller interrupting the first load cycle, and the controller saving data associated with the first load cycle into a memory associated with the controller.

In accordance with another embodiment, a machine is disclosed. The machine may include an implement assembly for loading payload material onto at least one receptacle, an operator interface configured to receive input from and output data to an operator of the machine, and a controller in communication with the implement assembly and the operator interface. The controller may be configured to receive signals from the implement assembly, start a first load cycle to monitor loading of payload material onto a first receptacle using signals received from the implement assembly, send a signal to the operator interface to display a pause button, receive a signal from the operator interface indicating that the pause button was pressed, pause the first load cycle, save data associated with the first load cycle into a memory associated with the controller, and start a second load cycle to monitor loading of payload material onto a second receptacle using signals received from the implement assembly while the first load cycle is paused.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

The present disclosure provides a system and method for managing loading operations of a machine. The system and method provide a way to monitor payloads and record non-sequential loading data. An operator of the machine can pause a first loading cycle, save data associated with the first loading cycle, and resume the first loading cycle at a later time.

For example, due to a different higher priority loading operation, the first loading cycle may need to be interrupted. The system and method allows the operator to pause the first loading cycle, and start a second loading cycle for the higher priority loading operation without losing any data associated with the first loading cycle. The operator may then return to the first loading cycle, such as, after the second loading cycle is complete, and resume the first loading cycle from the point it was interrupted.

Reference will now be made in detail to specific embodiments or features, examples of which are illustrated in the accompanying drawings. Generally, corresponding reference numbers will be used throughout the drawings to refer to the same or corresponding parts.

Figure 1:
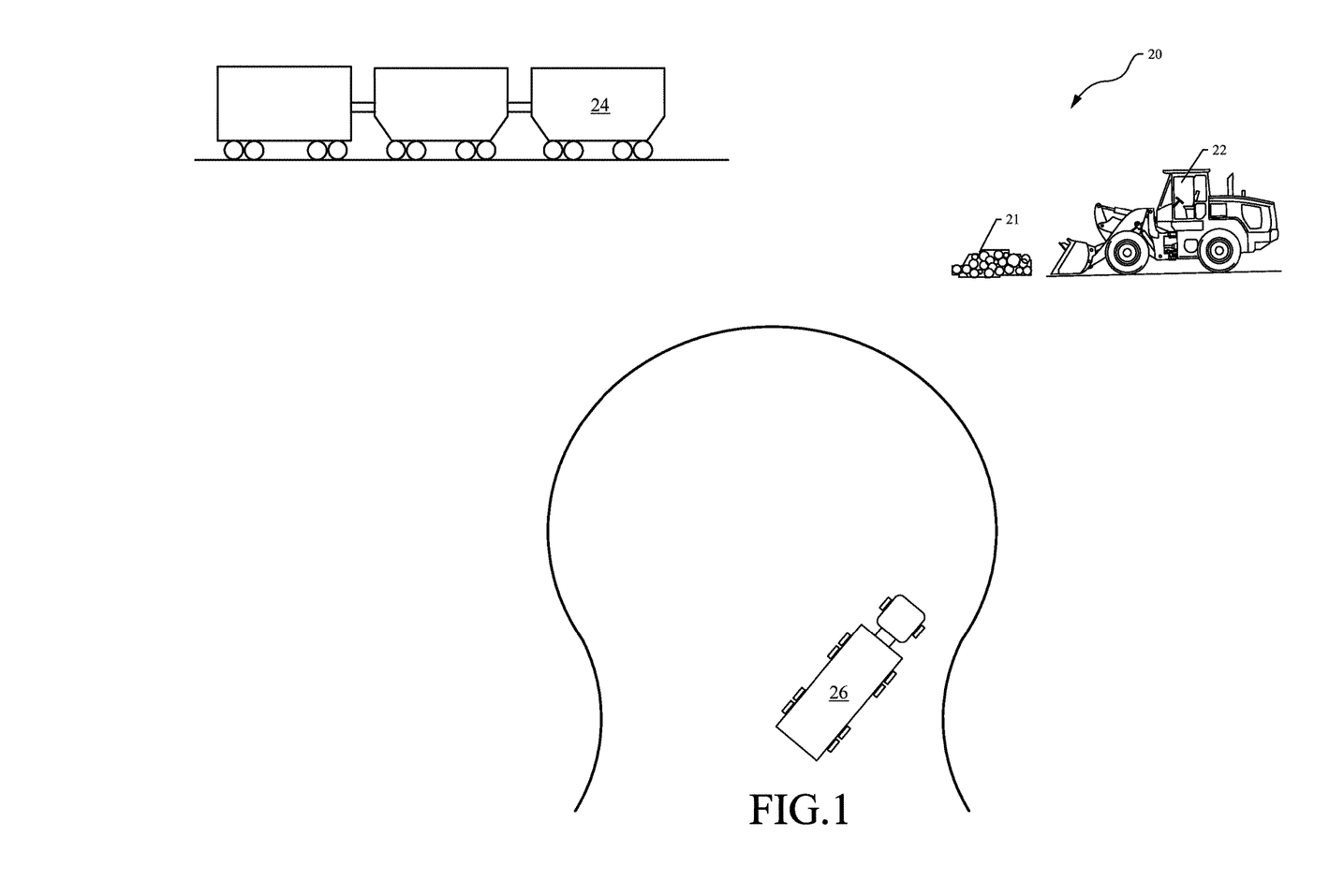
FIG. 1 is a diagrammatic view of a worksite in accordance with one embodiment of the present disclosure.

FIG. 1 illustrates an example worksite 20 including a machine 22, a first receptacle 24, and a second receptacle 26 consistent with certain embodiments of the present disclosure. For example, worksite 20 may be a quarry, a mine site, a landfill, a construction side, a road work site, or any other type of worksite. Various tasks may be performed at worksite 20 including loading operations or other operations. In one example, worksite 20 may include one or more types of payload material 21, which may be loaded by the machine 22 onto haul receptacles to be removed from worksite 20. For instance, the machine 22 may load payload material 21 onto first and second receptacles 24, 26. Examples of the types of payload material 21 may include, but not be limited to, dirt, rocks, sand, gravel, etc.

It is to be understood that although the first receptacle 24 is illustrated as a railcar, and the second receptacle 26 is illustrated as a bed of a dump truck, the first and second receptacles 24, 26 may be of any other type and may be associated with any type of vehicle or machine. Furthermore, although the machine 22 is illustrated as a wheel loader, the machine 22 may be of any other type. As used herein, the term "machine" refers to a mobile or stationary machine that performs an operation involving physical movement associated with a particular industry, such as, without limitation, mining, construction, landscaping, forestry, transportation, agriculture, etc.

Non-limiting examples of machines include commercial and industrial machines, such as, wheel loaders, backhoe loaders, track-type loaders, skid-steer loaders, multi-terrain loaders, compact track loaders, tractors, or other types of machines that operate in a work environment. It is also to be understood that the machine 22 is shown primarily for illustrative purposes to assist in disclosing features of various embodiments, and that FIG. 1 does not depict all of the components of a machine.

Figure 2:
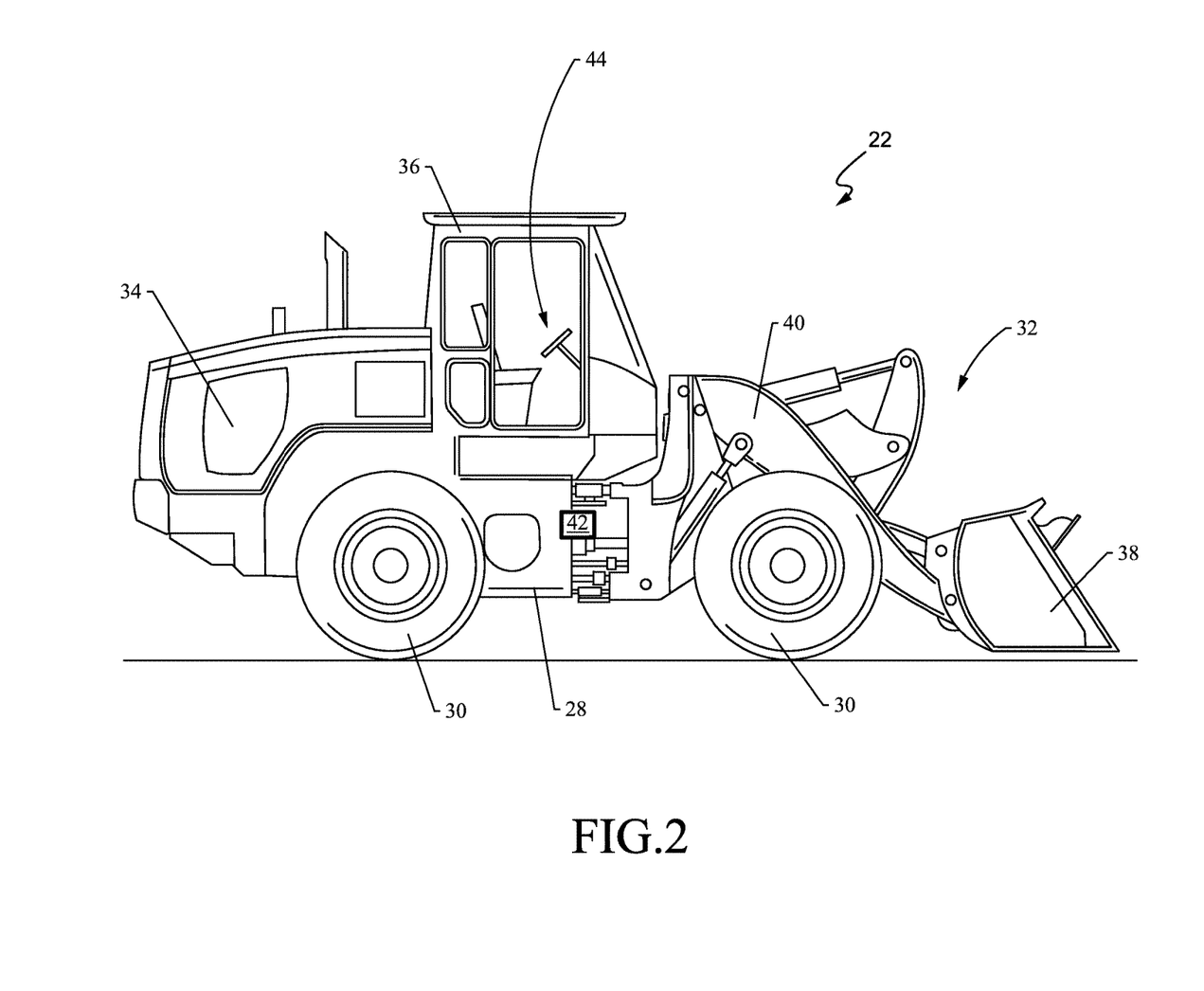
FIG. 2 is a side view of a machine constructed in accordance with another embodiment of the present disclosure.

Turning now to FIG. 2, with continued reference to FIG. 1, machine 22 may include a frame 28 which supports fraction devices 30, an implement assembly 32, an engine 34 or other power source, and an operator cab 36. Although traction devices 30 are shown as wheels, traction devices 30 may be tracks or any other type of traction device. The implement assembly 32 may include a bucket 38 or other implement mounted to one or more linkages 40.

A power system 42 of the machine 22 may be configured to drive and control the traction devices 30 and implement assembly 32. In one embodiment, the power system 42 may be hydraulic but could be alternatively driven as by, but not limited to, mechanical, electrical, and pneumatic systems. For example, the power system 42 may include one or more pumps, motors, valves, cylinders, and the like.

The operator cab 36 may contain an operator interface 44, which may be configured to receive input from and output data to an operator of the machine 22. The operator interface 44 may output data to the operator through a visual display or audible sound, etc. For example, the operator interface 44 may include a plurality of operator controls for controlling operation of the machine 22 and the implement assembly 32. Examples of operator controls may include, but not be limited to, one or more touchscreens, such as touchscreen 56 in FIG. 4, displays, monitors, screens, joysticks, pedals, steering wheels, buttons, switches, dials, levers, steering wheels, keyboards, control panels, instrument panels, gauges, speakers, voice recognition software, microphones, etc.

Figure 3:
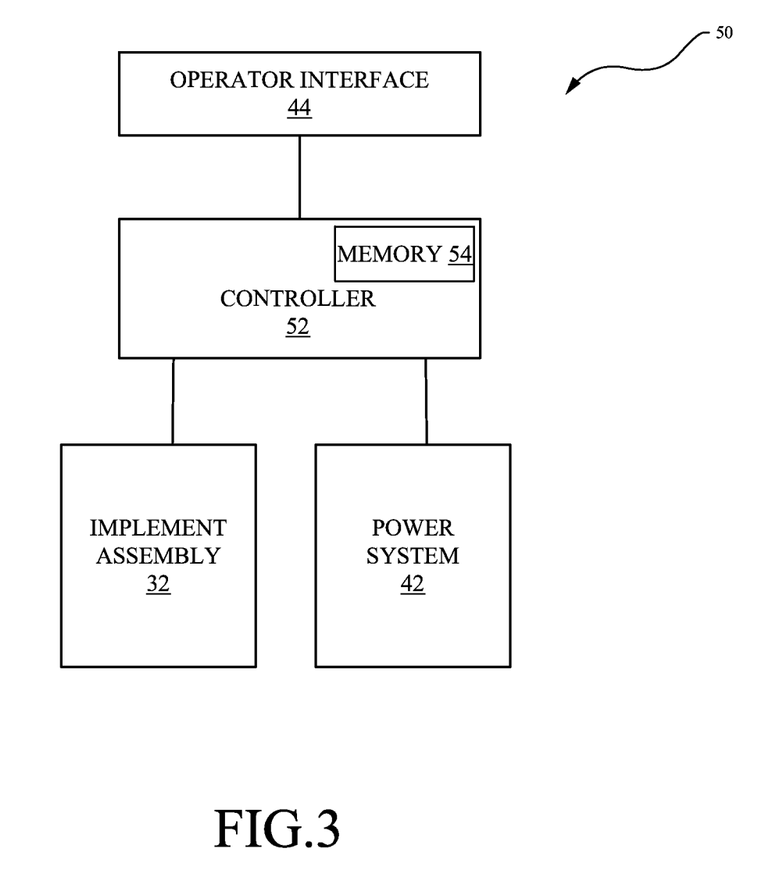
FIG. 3 is a diagrammatic view of a payload monitoring system of the machine of FIG. 2.

Referring now to FIG. 3, with continued reference to FIGS. 1 and 2, the machine 22 may further include a payload monitoring system 50. The payload monitoring system 50 may comprise a controller 52 in communication with the implement assembly 32, power system 42, and operator interface 44. The controller 52 may comprise a processor, such as a "computer processor," or processor-based device that may include or be associated with a non-transitory computer readable storage medium having stored thereon computer-executable instructions. One or more algorithms may be programmed into a memory 54 associated with the controller 52. The memory 54 may comprise a non-volatile memory. It is understood that the payload monitoring system 50 and controller 52 may include other hardware, software, firmware, or combinations thereof.

The payload monitoring system 50 may be configured to monitor load cycles of the machine 22. A load cycle may refer to a number of bucket loads or increments the machine 22 takes to load a predetermined amount of payload material onto a haul receptacle or more than one haul receptacle. For example, using the bucket 38, the machine 22 may load the haul receptacle incrementally with discrete amounts of payload material. The payload monitoring system 50 may use the number of bucket loads or increments and an amount of payload material in each increment to determine a total amount of payload material loaded onto the haul receptacle.

To determine the amount of payload material in each increment, for example, the controller 52 may be configured to receive signals from the implement assembly 32 and the power system 42. For instance, the signals from the implement assembly 32 may be indicative of pressures on the one or more linkages 40, and the signals from the power system 42 may be indicative of hydraulic oil temperatures. Based on the signals received from the implement assembly 32 and power system 42, as well as predetermined calibration data, the controller 52 may calculate a weight in the bucket 38. However, other ways of determining the weight or amount of payload material in the bucket 38 are certainly possible.

Furthermore, the controller 52 may be configured to keep track of the number of bucket loads or increments. For example, the controller 52 may analyze the weight in the bucket 38 and may detect an increment based on a sequence of weights. When the weight in the bucket 38 starts at zero or the bucket 38 is empty, then increases to a non-zero weight indicating that the bucket 38 contains payload material, and subsequently returns to zero when the bucket 38 dumped the payload material into the haul receptacle, the controller 52 may detect an increment. The controller 52 may keep track of a total of the number of increments, adding an increment each time that sequence is detected. However, other ways of determining the number of increments are certainly possible.

Figure 4:
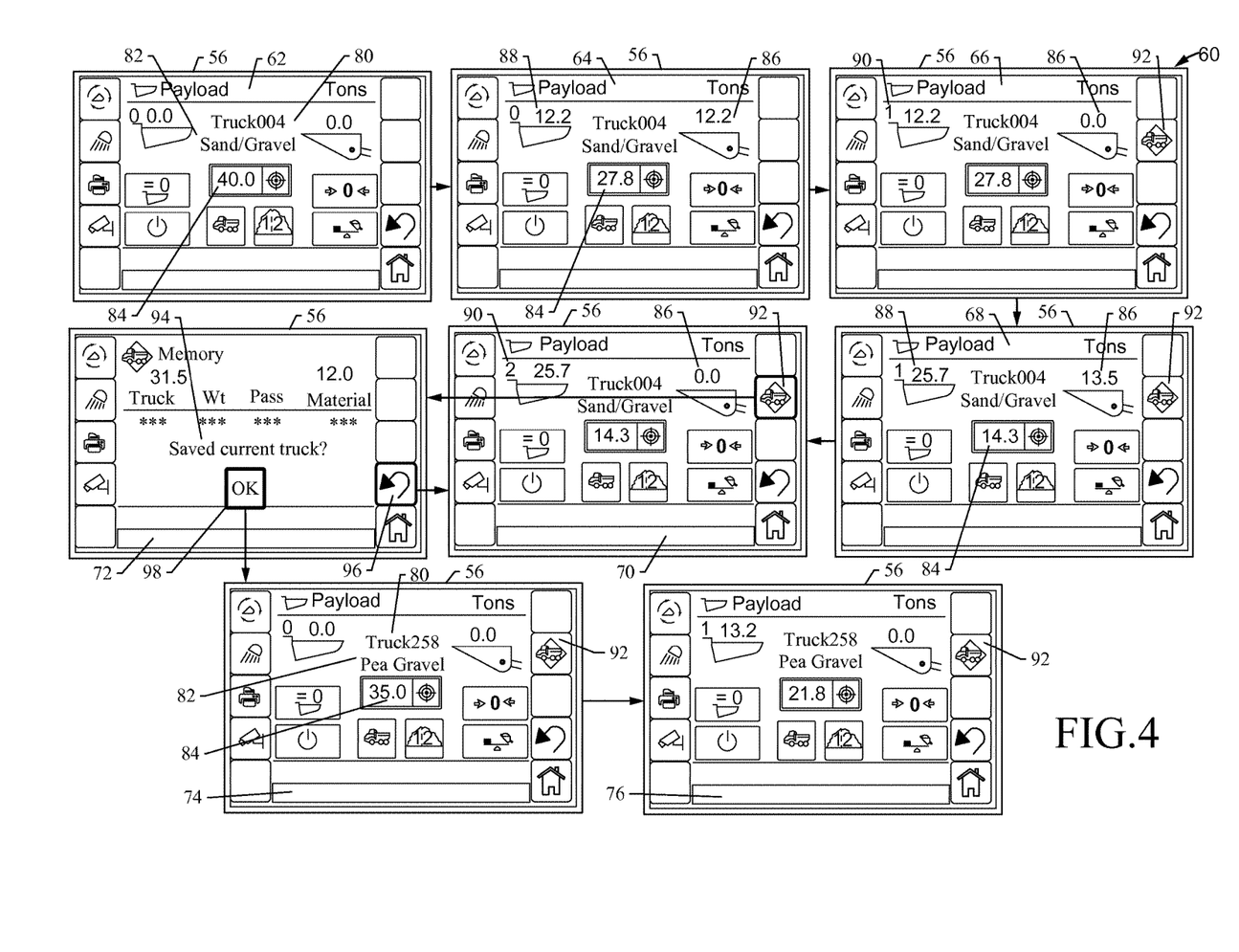
FIG. 4 is a diagrammatic view of a process for managing loading operations with the payload monitoring system of FIG. 3.

Referring now to FIG. 4, with continued reference to FIGS. 1-3, a flow diagram of example displays on a touchscreen 56 or other device of the operator interface 44 depicting a process 60 for managing loading operations with the payload monitoring system 50 is shown. At display 62, to start a first load cycle, e.g., for the first receptacle 24, the operator may input data into the operator interface 44, such as, but not limited to, a receptacle identifier 80, a payload material type 82, and a total target weight 84 of payload material to be added to the first receptacle 24. The controller 52 may send signals to the operator interface 44 to display data associated with the first load cycle. The data can be displayed on the touchscreen 56.

At display 64, when the bucket 38 of the machine 22 contains payload material, the controller 52 may calculate and display a bucket weight 86 of the payload material in the bucket 38. The controller 52 may add the bucket weight to a receptacle weight 88 in the first receptacle 24, and subtract the bucket weight from the total target weight 84, displaying such on the operator interface 44. At display 66, when the machine 22 empties the payload material from the bucket 38 to the first receptacle 24, the controller 52 may determine that the bucket weight 86 is zero again, thereby detecting and displaying an increment count 90.

The payload monitoring system 50 may continue tracking the first load cycle in a similar manner for subsequent bucket loads or increments. For example, at display 68, the controller may determine the bucket weight 86 when the machine 22 fills the bucket 38 with payload material again, adding that bucket weight to the receptacle weight 88, subtracting the bucket weight from the total target weight 84, and, at display 70, increasing the increment count 90. The increment count 90 may be increased, for example, when the bucket weight 86 is zero again and an increment is detected. The controller 52 may continue to display tracking throughout the first load cycle on the operator interface 44.

Moreover, the payload monitoring system 50 may allow load cycles to be interrupted without losing associated data. For example, a pause button 92 may be displayed on the operator interface 44, as shown in the touchscreen 56 on displays 66, 68, 70, 74, and 76. The pause button 92 may be a separate input button, although other configurations are certainly possible. In the example process 60, when the operator presses the pause button 92 at display 70, the controller 52 may be configured to receive a signal from the operator interface 44 to pause the first load cycle, or stop tracking for the first load cycle. The controller 52 may then pause or stop monitoring of the first load cycle. For example, the controller 52 may stop tracking the increment count or payload amount for the first load cycle.

The controller 52 may also be configured to save data associated with the first load cycle when the first load cycle is paused. Data associated with a load cycle may include, but not be limited to, the receptacle identifier 80, the receptacle weight 88, the payload material type 82 or material identification, the increment count 90, a load unique identifier, a load start time, a duration, a receptacle weight, bucket weights for each increment, a load site identification, a fuel usage, whether use is billable or non-billable, etc. For instance, when the operator presses the pause button 92, the controller 52 may, at display 72, present a prompt 94 to save current data. However, it is certainly possible for the controller 52 to automatically save the current data upon receiving the signal from the operator interface 44 to pause the first load cycle, e.g., instead of presenting the prompt 94.

At display 72, the operator may choose to not save the current data and may press a return button 96 to resume monitoring of the first load cycle. If, at display 72, the operator chooses to save the current data, e.g., by pressing an "OK" button 98, the controller 52 will save data associated with the first load cycle in the memory 54 of the controller 52. In another embodiment, the data may be saved and retrieved remotely, instead or in addition to the payload monitoring system 50 of the machine 22. For example, a worksite office or the haul receptacles may be able to save, download, and retrieve the data stored in the memory 54 of the controller 52.

The first load cycle may then be resumed at a later time. For example, the controller 52 may continue tracking the first load cycle, which may include monitoring of the increment count and payload amount from the point the first load cycle was last paused. The controller 52 may retrieve the saved data associated with the first load cycle from memory 54 at a later time, such as, but not limited to, when the first load cycle is resumed or when the data is downloaded or printed. The payload monitoring system 50 may then continue tracking the first load cycle from the point it was interrupted.

The controller 52 may be further configured to start a second load cycle when the first load cycle is paused. At display 74, the operator may start a second load cycle, e.g., for the second receptacle 26, and may input data into the operator interface 44, such as, but not limited to, the receptacle identifier 80 of the second receptacle 26, the payload material type 82 for the second receptacle 26, and the total target weight 84 of payload material to be added to the second receptacle 26. The controller 52 may send signals to the operator interface 44 to display data associated with the first load cycle, e.g., on the touchscreen 56. Furthermore, the controller 52 may continue to monitor and display tracking of the second load cycle as described above with the first load cycle.

In addition, the payload monitoring system 50 may display indication to the operator that the first load cycle is paused. For example, the pause button 92 on display 74 may change to a different color as previously displayed. In this example, the pause button 92 may be a first color when no load cycles are paused. The pause button 92 may then be a second color that is different than the first color when a load cycle is paused. For instance, the first color may be gray, and the second color may be green. However, other configurations and indications are certainly possible.

After completion of the second load cycle, the operator may then resume the first load cycle. However, the payload monitoring system 50 may allow interruption of the second load cycle, as well, before completion of the second load cycle. For instance, at display 76, the pause button 92 may be displayed on the touchscreen 56, and the operator may press the pause button 92 to stop the second load cycle.

The controller 52 may be configured to receive a signal from the operator interface 44 to pause the second load cycle when the pause button 92 is pressed and may be configured to pause the second load cycle upon receiving the signal from the operator interface 44. Upon pausing of the second load cycle, the controller 52 may be configured to save data associated with the second load cycle, resume the first load cycle, and/or start a third load cycle or more than three load cycles. In addition, the controller 52 may be configured to display indication to the operator that the second load cycle is paused. At a later time, upon receiving a signal from the operator interface 44, the controller 52 may be configured to retrieve saved data associated with the second load cycle from memory 54 and resume the second load cycle from the point it was paused.

In an example, when the operator presses the pause button 92 to stop the second load cycle at display 76, the controller 52 may be configured to automatically save data associated with the second load cycle and automatically resume the first load cycle. In this example, when the first load cycle resumes, the pause button 92 may be the second color to indicate that the second load cycle is paused. For instance, the pause button 92 may be green, although other configurations and indications are certainly possible. Furthermore, when the operator presses the pause button 92 again, the controller 52 may be configured to automatically save data associated with the first load cycle and automatically resume the second load cycle. In so doing, the operator may easily switch between the first and second loading cycles.

Figure 5:
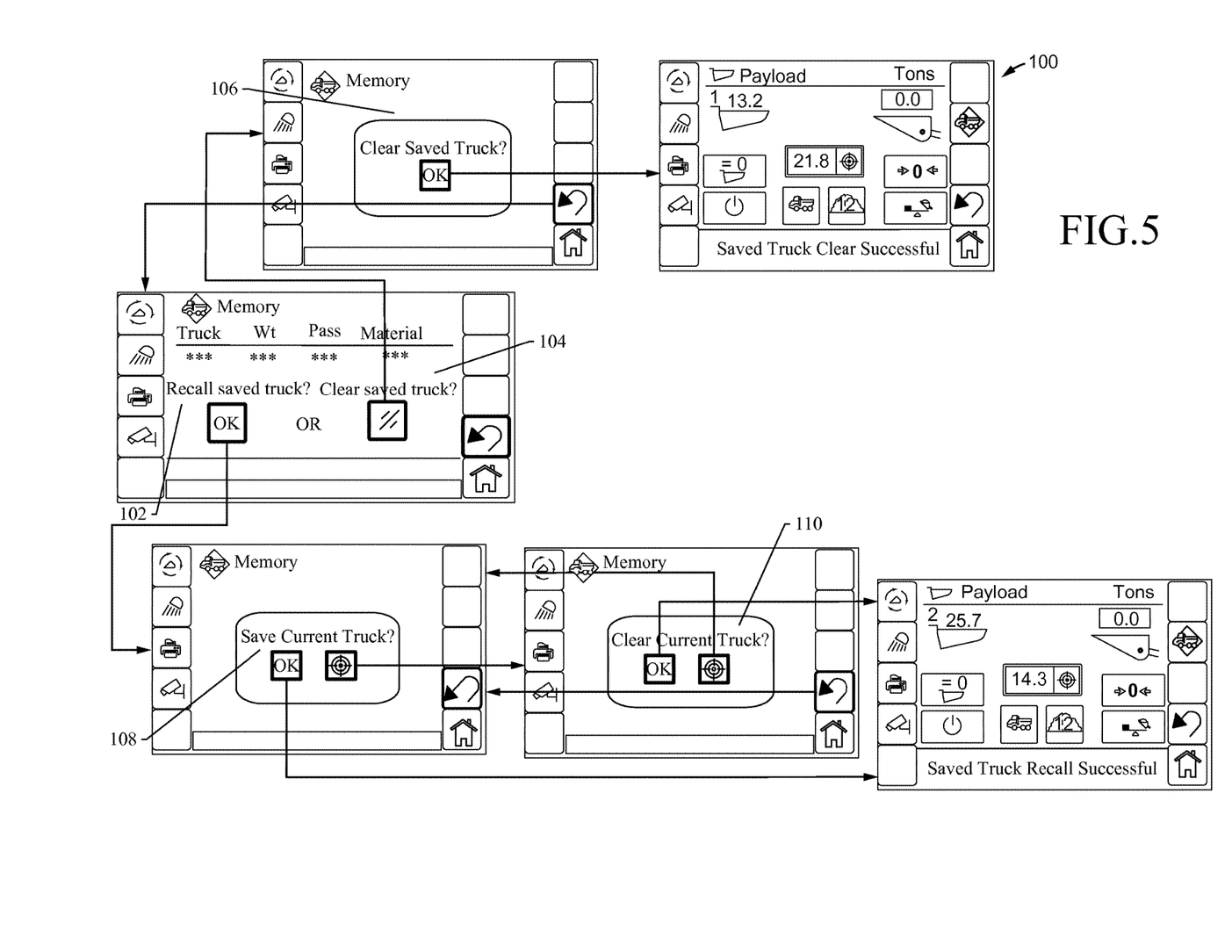
FIG. 5 is a diagrammatic view of another process for managing loading operations with the payload monitoring system of FIG. 3.

In another example, shown in FIG. 5, a flow diagram of example displays depicting a process 100 for managing loading operations with the payload monitoring system 50 is shown. The process 100 may continue from display 76 (FIG. 4) when the operator presses the pause button 92, although it does not necessarily have to. As shown in the process 100, the controller 52 may provide prompts 102, 104, 106, 108, and 110 in order to recall, save, and clear data associated with the first and second load cycles when the second load cycle is paused. It is to be understood that the displays and flow diagrams of FIGS. 4 and 5 are shown for example purposes only. It is certainly possible to have different configurations and visual representations.

Figure 6:
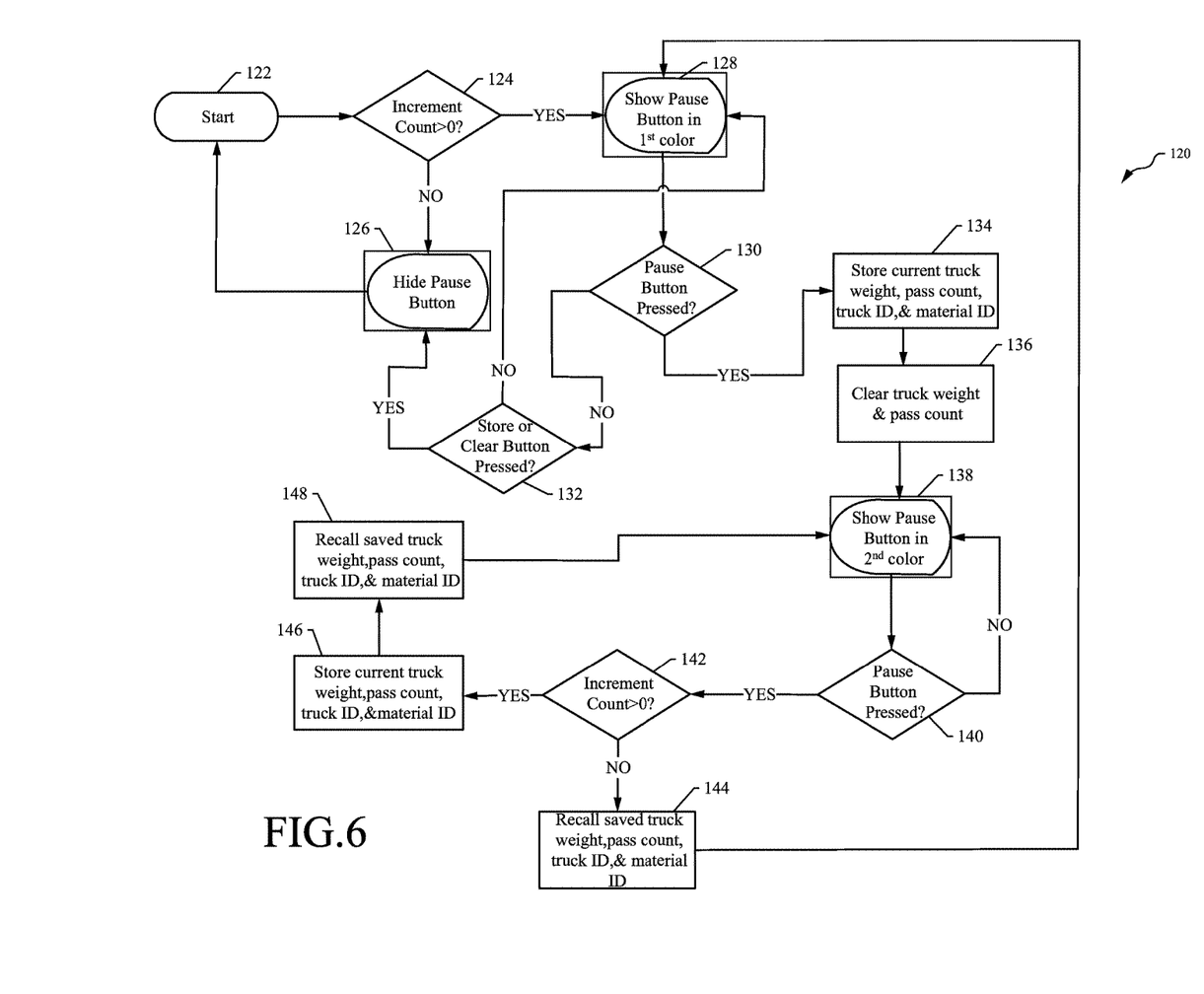
FIG. 6 is a flowchart illustrating a process for managing loading operations on a machine according to another embodiment.

Turning now to FIG. 6, with continued reference to FIGS. 1-5, a flowchart outlining an example process 120 for managing loading operations of the machine 22 with the payload monitoring system 50 is shown. At block 122, the process 120 starts. At block 124, the controller 52 determines whether the increment count 90 is greater than zero. If the increment count is not greater than zero, then, at block 126, the pause button 92 does not appear on the touchscreen 56 of the operator interface 44, as in displays 62, 64. If, at block 124, the increment count is greater than zero, then, at block 128, the pause button 92 is shown on the touchscreen 56, as in displays 66, 68, and 70.

At block 130, the controller 52 determines whether the pause button 92 has been pressed by the operator. If the pause button 92 is not pressed, at block 132, the controller 52 determines whether a store button or a clear button has been pressed by the operator. If both of the store and clear buttons have not been pressed, the process 120 returns to block 128. If either of the store or clear buttons has been pressed, the process 120 returns to block 126.

If, at block 130, the pause button 92 has been pressed, then at block 134, the controller 52 stores current data associated with the first load cycle. The data associated with the first load cycle can comprise, for example, receptacle weight, increment count, receptacle identifier, payload material type, etc. At block 136, the controller 52 clears or re-sets the receptacle weight and the increment count in order to start monitoring a new load cycle, e.g., the second load cycle. The controller 52 then indicates that the first load cycle is paused via the operator interface at block 138. For example, the pause button 92 may appear in the second color, which is different from the first color.

At block 140, the controller 52 determines whether the pause button 92 has been pressed by the operator. If the pause button 92 is not pressed, the process 120 returns to block 138. If the pause button 92 has been pressed, then the controller 52 determines whether the increment count is greater than zero at block 142.

If the increment count is not greater than zero, the controller 52 recalls to the touchscreen the data associated with the first load cycle, which was saved at block 134. For example, the receptacle weight, increment count, receptacle identifier, payload material type, etc. may be recalled to the touchscreen. The process 120 then proceeds to block 128.

If, at block 142, the increment count is greater than zero, then at block 146, the controller 52 stores current data associated with the second load cycle. The data associated with the second load cycle can comprise, for example, receptacle weight, increment count, receptacle identifier, payload material type, etc. At block 148, the controller then recalls to the touchscreen the data associated with the first load cycle, which was saved at block 134. For example, the receptacle weight, increment count, receptacle identifier, payload material type, etc. may be recalled to the touchscreen. Then the process returns to block 138.

It is to be understood that the flowchart in FIG. 6 is shown and described as an example only to assist in disclosing the features of the system and that more or fewer steps than shown, in a same or different order, may be included in the method corresponding to the various features described above for the disclosed system without departing from the scope of the present disclosure.

INDUSTRIAL APPLICABILITY

In general, the foregoing disclosure finds utility in various industrial applications, such as in earthmoving, construction, industrial, agricultural, and forestry machines. In particular, the disclosed control system and method may be applied to wheel loaders, backhoe loaders, track-type loaders, skid-steer loaders, multi-terrain loaders, compact track loaders, tractors, and the like.

By applying the disclosed payload monitoring system and system to a machine, operators may interrupt load cycles without losing associated data. For example, if a machine is loading a railcar on a worksite, this loading operation may take a significant amount of time and numerous passes of payload material. A higher priority loading operation, such as, on a dump truck, may need to be performed before the railcar loading operation is finished. In prior art payload monitoring systems, if a cycle was interrupted, the associated data was either deleted or the load cycle was completed and could not be re-opened.

With the disclosed payload monitoring system and method, an operator can pause the load cycle and save the associated data in order to resume the load cycle at a later time. In addition, a new load cycle may be selected, completed, interrupted, and saved with its unique data while the other load cycle is still paused. Moreover, additional trucks may be loaded and the interrupted load cycle may be resumed at the point it was paused.

In so doing, higher priority loading operations may be performed and new load cycles may be started without affecting the data associated with the interrupted load cycle. Furthermore, by using the disclosed system and method, all machine productivity data may be captured electronically, and retrieved, downloaded, or printed, thereby enabling easy analysis to optimize machine usage and performance. For example, data associated with the load cycle may include, but not be limited to, the receptacle identifier, the receptacle weight, the payload material type or material identification, the increment count, the load unique identifier, the load start time, the duration, the receptacle weight, bucket weights for each increment, the load site identification, the fuel usage, and whether the use is billable or non-billable.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A payload monitoring system, comprising:
    a machine including an implement assembly for loading payload material onto at least one receptacle;
    an operator interface configured to receive input from and output data to an operator of the machine; and
    a controller in communication with the machine and the operator interface, the controller configured to:
    receive first signals from the implement assembly,
    start a first load cycle to monitor loading of payload material by the implement assembly onto a first receptacle, based on the first signals received from the implement assembly,
    receive a signal from the operator interface to pause the first load cycle,
    stop monitoring of the first load cycle,
    save data associated with the first load cycle into a memory associated with the controller, and
    start a second load cycle to monitor loading, by the implement assembly, of payload material onto a second receptacle,
        the second load cycle being monitored based on second signals received from the implement assembly.

2. The payload monitoring system of claim 1, wherein the controller is configured to send a signal to the operator interface to display a pause button.

3. The payload monitoring system of claim 1, wherein the controller is configured to receive a signal from the operator interface to resume the first load cycle, and continue monitoring of the first load cycle.

4. The payload monitoring system of claim 1, wherein the data associated with the first load cycle includes an increment count and a payload amount.

5. The payload monitoring system of claim 1, wherein the controller is configured to send a signal to the operator interface to indicate that the first load cycle is paused.

6. The payload monitoring system of claim 5, wherein the controller is configured to start a second load cycle when the first load cycle is paused.

7. The payload monitoring system of claim 6, wherein the controller is configured to complete the second load cycle and save data associated with the second load cycle into the memory associated with the controller while the first load cycle is paused.

8. The payload monitoring system of claim 6, wherein the controller is configured to pause the second load cycle and save data associated with the second load cycle in the memory associated with the controller.

9. The payload monitoring system of claim 8, wherein the controller is configured to continue monitoring of the first load cycle when the second load cycle is paused.

10. The payload monitoring system of claim 8, wherein the controller is configured to send a signal to the operator interface to indicate that the second load cycle is paused.

11. The payload monitoring system of claim 8, wherein the controller is configured to start a third load cycle when the second load cycle is paused.

12. A method for managing loading operations of a machine having a controller and an implement assembly for loading payload material onto at least one receptacle, the method comprising:
    receiving first signals from the implement assembly,
    starting, by the controller and based on the first signals received from the implement assembly, a first load cycle to monitor loading of payload material by the implement assembly onto a first receptacle;
    interrupting, by the controller, the first load cycle;
    saving, by the controller, data associated with the first load cycle into a memory associated with the controller; and
    starting, by the controller and based on second signals from the implement assembly, a second load cycle to monitor loading of payload material by the implement assembly onto a second receptacle.

13. The method of claim 12, further comprising interrupting the second load cycle, and the controller saving data associated with the second load cycle into the memory associated with the controller.

14. The method of claim 12, further comprising resuming the first load cycle after saving data associated with the second load cycle into the memory associated with the controller.

15. The method of claim 14, further comprising retrieving saved data associated with the second load cycle from the memory associated with the controller.

16. A machine, comprising:
    an implement assembly for loading payload material onto at least one receptacle;
    an operator interface configured to receive input from and output data to an operator of the machine; and
    a controller in communication with the implement assembly and the operator interface, the controller configured to:
    receive signals from the implement assembly,
    start a first load cycle to monitor loading of payload material onto a first receptacle using signals received from the implement assembly,
    send a signal to the operator interface to display a pause button,
    receive a signal from the operator interface indicating that the pause button was pressed,
    pause the first load cycle,
    save data associated with the first load cycle into a memory associated with the controller, and
    start a second load cycle to monitor loading of payload material onto a second receptacle using signals received from the implement assembly while the first load cycle is paused.

17. The machine of claim 16, wherein the controller is configured to receive a signal from the operator interface to resume the first load cycle, and retrieve saved data associated with the first load cycle from the memory associated with the controller.

18. The machine of claim 16, wherein the controller is configured to send a signal to the operator interface to indicate that the first load cycle is paused.

19. The machine of claim 16, wherein the data associated with the first load cycle includes an increment count and a payload amount.

* * * * *